Jan. 10, 1928.
C. ESMARIAN
DEMOUNTABLE RIM
Filed Feb. 13, 1924
1,655,991
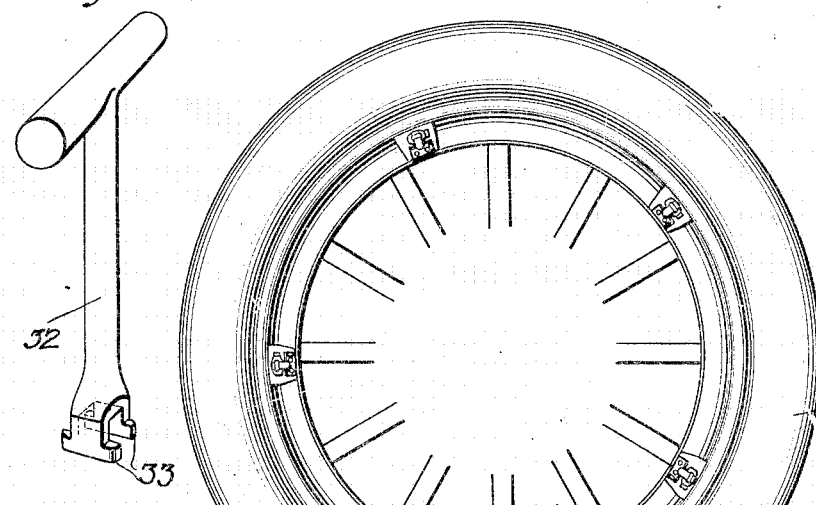
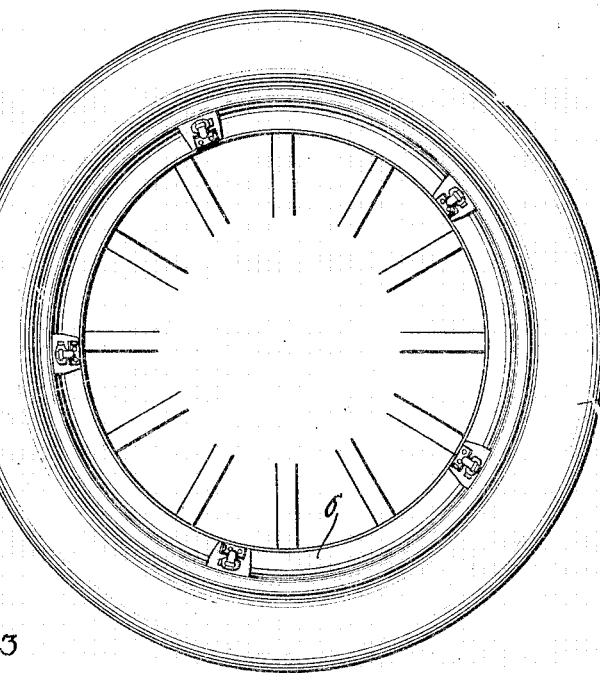
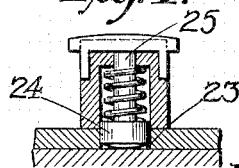
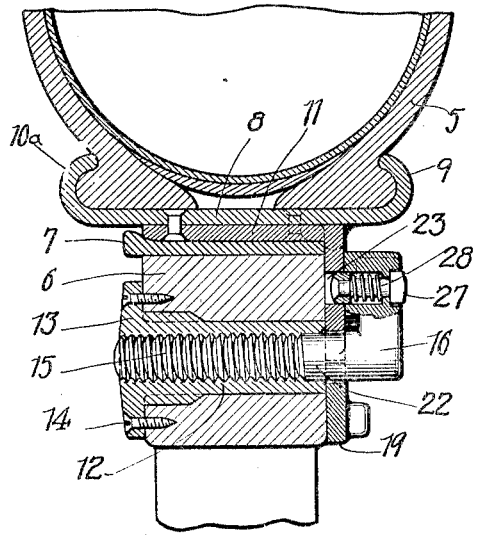
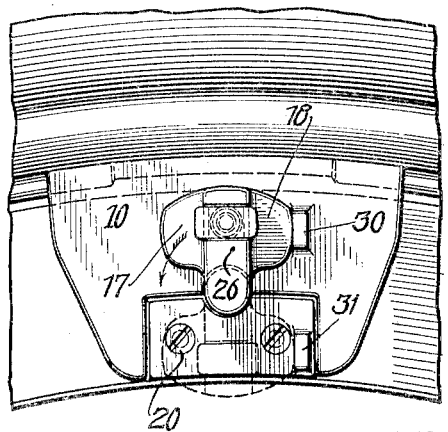
INVENTOR.
CHARLES ESMARIAN.
BY Richard Brown.
ATTORNEY.

Patented Jan. 10, 1928.

1,655,991

UNITED STATES PATENT OFFICE.

CHARLES ESMARIAN, OF PATERSON, NEW JERSEY.

DEMOUNTABLE RIM.

Application filed February 13, 1924. Serial No. 692,568.

This invention relates to demountable rims for vehicle tires and has for one of its objects to provide in combination a rim and rim retaining means for use in connection with vehicle tires to permit their removal with facility and ease without the necessity of resorting to the use of detachable fastening bolts.

One of the objects of my invention is the construction of a demountable rim consisting of circumferentially disposed members for retaining a plurality of fastening and locking bolts including provision for easily disconnecting said bolts to permit the separation of the rim from the wheel.

Another object of my invention is the construction of a demountable rim including a novel and improved locking bolt, constructed and arranged so as to positively retain the parts in position and further affording a positive means for setting the bolts circumferentially of the rim.

A further object of my invention is the construction of a demountable rim of the class described which is extremely simple in construction, highly efficient in operation and use, strong, practical, durable, consisting of a minimum number of parts and otherwise adapted to be manufactured at an extremely low cost, whereby its commercial possibilities are greatly enhanced.

I accomplish the above objects and others, reference being had to the accompanying drawings, showing a preferred embodiment of my invention and wherein;

Figure 1 is a view in side elevation of a vehicle wheel embodying my improvement.

Figure 2 is a sectional view showing the combination rim in its relation to one of the locking bolts.

Figure 3 is a side view, showing the lock bolt in the full line, locked position and in dotted line, in unlocked position, with respect to the rim.

Figure 4 is a detail of the locking bolt head.

Figure 5 is a key adapted to be used for rotating the locking bolt head.

Referring now to the drawings wherein like reference characters designate corresponding parts throughout the several views, 5 designates a pneumatic tire of the clincher type and 6 the felly of a vehicle wheel. A steel ring 7 is mounted on the felly and the tire is held by the removable rim 8, the outer edges 9, 10ª, being curved inwardly to clinch and grip the said tire as clearly shown by Figure 2 of the drawings. Riveted or otherwise secured to the inner face of the rim 8, I have provided a plurality of radial, substantially wide plates 10 which are L-shaped in cross section. The plates 10 abut the outer side of the felly and the flat portions thereof overlie the steel rim 7. Extending transversely through the felly 6 at different points on its circumference, are the sleeves 12, one end of each of which is provided with an enlarged head 13 which is secured by screws or other fastening elements 14 to the inside of the felly. Each sleeve is internally threaded to receive the threaded portion 15 of a screw bolt, the enlarged head 16 of which extends at right angles to the main portion or stem of the bolt. The head is formed with oppositely disposed ears or wings 17, 18, which form bearing surfaces for the locking means subsequently to be referred to.

The inner portion of the plate 10 is partially cut away to interfit with a small auxiliary plate 19, which is secured to the felly on the outside thereof by the screws 20. A semi-circular aperture is formed in the inner portion of the plate 10 which cooperates with a similar semi-circular aperture in the face of the auxiliary plate 19 to permit of the passage of the stem portion 22 of the bolt. In order to securely lock and retain the bolt in position, the plate 10 is provided with an aperture 23, which is adapted to receive the enlarged end 24 of a locking pin 25, said pin passing through an aperture in the central raised portion 26 of the head 16. A substantially rectangular enlargement 27 at the opposite end of the pin and extending slightly beyond the raised portion 26 of the head, permits the pin to be moved outwardly against the resistance of the spring 28 held on the pin and bearing against the enlarged portion or shoulder 24 as shown by Figure 4 of the drawings. The raised stop preferably formed integral with the plate 10 and indicated by numeral 30 and a second raised stop 31, preferably formed integral with the auxiliary plate 19, permits the proper positioning of the head 16 in the locked and unlocked position when it is desired to assemble the parts. The key 32 is provided with lugs 33 on its lower end which are adapted to ride beneath the enlargement 27, so that by bearing outwardly on the wings 17, 18, the pin 25 may be withdrawn from the aperture 23 and the head 16 rotated a half turn to lock or unlock the rim. The stops 30 and 31 are so positioned that the head may be locked with certainty since the pin will fall in the slot 23 when the head 16 is turned.

My invention is particularly designed for use in connection with the type of demountable rim shown and described in my Patent Number 1,468,443, granted September 18, 1923.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States Letters Patent is:—

1. The combination with a demountable rim and a wheel felly, of a plurality of substantially wide plates attached to said rim and abutting the outer side of the felly, a sleeve for each of the plates extending through the felly, locking bolts having enlarged heads for the sleeves, said plates having apertures, and releasable means carried by the bolt heads cooperating with the apertures for locking the said bolts to the plate.

2. The combination with a demountable rim and a wheel felly, of a plurality of substantially wide plates attached to said rim and abutting the outer side of the felly, a threaded sleeve for each of the plates extending through the felly, a threaded locking bolt in each sleeve having an enlarged head formed thereon, said plates having apertures and spring held pins carried by each of the bolt heads and adapted to enter the apertures whereby the said bolts are locked to the plate.

3. The combination with a demountable rim and a wheel felly, of a plurality of substantially wide L-shaped plates attached to the rim and abutting the outer side of the felly, a threaded sleeve formed with each of the plates extending through the felly, a bolt having an enlarged head for each of the sleeves, said plates having apertures, spring held pins carried by the bolt heads cooperating with the apertures for locking the bolt heads to the plates and stops on the face of said plates for guiding the bolt heads into locking position.

In testimony whereof I affix my signature.

CHARLES ESMARIAN. [L. S.]